3,001,980
LUBRICATING OILS
Robert Tirtiaux, Notre-Dame de Gravenchon, and Jean Baptiste Signouret, Pau, France, assignors to Esso Standard Societe Anonyme Francaise, Paris, France, a body corporate of France
No Drawing. Filed July 22, 1957, Ser. No. 673,137
Claims priority, application France Aug. 4, 1956
7 Claims. (Cl. 260—125)

The present invention relates to lubricating oil additives and to improved lubricating compositions comprising these additives.

It is desirable to improve the properties of a lubricating oil by the addition of an additive which will prevent or retard corrosion, cylinder wear, seizure of pistons and the formation of sludge and carbon. Detergent additives are known which consist of metal salts and soaps. However, these detergent additives possess the drawback of yielding injurious ash, especially when the lubricant compositions containing them are used for lubricating engines consuming a large quantity of oil and running under particularly severe conditions (for instance aircraft engines) or engines supplied with cracked or sulphurised fuels leaving appreciable deposits. This ash accumulates in the combustion chamber, and may cause premature ignition, detonation, sooting of sparking plugs and the burning out of valves.

In order to obtain additives which would not form ash, an investigation was undertaken to prepare ashless lubricant additives. This investigation resulted in the present invention by the discovery of ashless detergent additives which, among other advantageous properties, prevents the accumulation of sludge in the engine.

The additives according to the present invention are obtained by reacting a copolymer or polymer of an ester with phosphorus sulphide and then reacting the phosphosulphurised derivative to obtained with alkylene oxide, the said ester being an ester of an $\alpha\beta$ unsaturated carboxylic acid and an unsaturated aliphatic alcohol.

The ester monomers of the polymers and copolymers used to prepare the additives will be discussed next. The unsaturated aliphatic alcohol components of the ester may be straight or branched chain and may contain from 3 to 20 carbon atoms and preferably from 9 to 18 carbon atoms. The unsaturated aliphatic alcohols may contain more than one double bond. It is believed that the subsequent reaction with phosphorus sulphide takes place at the double bond. The $\alpha\beta$ unsaturated carboxylic acid may be of the form $RR'C=CR''COOH$ wherein R, R' and R'' represent hydrogen, halogen, alkyl, aryl, thiol or hydroxyl groups. R or R' may also be carboxyl groups. The ester monomers derived from maleic or fumaric acid or the alkyl derivative thereof are particularly useful for this invention. The ester monomers may be prepared by esterification of the unsaturated aliphatic alcohol with the $\alpha\beta$ unsaturated carboxylic acid. Alternatively the acid chloride or acid anhydride may be reacted with the alcohol.

The phosphosulphurised derivative obtained from the interaction of the polymer or copolymer and phosphorus sulphide viz. phosphorus pentasulphide, may be reacted with an alkylene oxide containing from 2 to 6 carbon atoms. Ethylene oxide is particularly preferred.

The copolymers used to prepare the additives will be discussed next. The polymers may be prepared by copolymerising the aforementioned ester monomer with one or more of the following: Esters of maleic and fumaric acids and alkyl derivatives thereof and in particular the esters of Oxo alcohols e.g. $C_{16}$ to $C_{17}$ Oxo alcohols.

Esters of unsaturated alcohols, such as vinyl esters, for instance vinyl acetate etc.

Esters of alcohols containing no ether function, in particular unsaturated aliphatic acids such as methacrylates of $C_3$ to $C_{20}$ alcohols.

Ethylene hydrocarbons, for instance styrene etc.

Unsaturated nitriles, for instance acrylonitrile etc.

Anhydrides of unsaturated diacids, for instance maleic anhydride etc.

It is possible to apply a number of methods of polymerisation and copolymerisation. The effects of heat and pressure can be used with or without catalysts. The latter are peroxides, boron fluoride, aluminium chloride. Benzyl peroxide is generally preferred.

The reaction may be conducted for a period of time of from 2 to 100 hours, depending on the catalyst. The temperature may vary from 50 to 150° C. It is possible to carry out the reaction in the presence of inert solvents such as petrol, a light lubricating oil, chloroform etc., so as to check the speed of the reaction or the molecular weight of the product.

According to the invention, it is possible to use any phosphorus sulphide, a mixture of two or more sulphides or a mixture of phosphorus and elementary sulphur, but it is preferable to use phosphorus pentasulphide.

The time of the reaction of the phosphorus sulphide on the polymer varies according to the temperature, and may range from 2 to 20 hours. It is preferable to react from 1 to 10, better still from 2 to 5 molecules of polymer with one molecule of phosphorus sulphide. It is as advisable to operate in a non-oxidising atmosphere, e.g. nitrogen. Finally, it is as advisable to continue the reaction until the whole of the sulphide has reacted, so as to avoid subsequent purification.

The condensation of an alkylene oxide with the phosphosulphurised derivative obtained as stated above can be carried out by reaction with an alkylene oxide or condensation with a poly-alkylene glycol.

The quantity of the additive according to the invention to be added to lubricating oils to confer upon them advantageous properties is for preference between 0.01 and 30%, still better, between 0.5 and 10% of the total weight of the lubricating composition. The optimum percentage depends on the proposed use; if the essential property sought is detergence, there should be added to the lubricant composition from 0.1 to 5% of the additive according to the invention; if extreme pressure properties are likewise required, a percentage of 0.5 to 10% should be added for preference.

The basic oil used in the compositions of the present invention can be selected from among the synthetic, animal, vegetable or mineral lubricating oils, distillates based on crude paraffin oils, naphthenic or asphaltic oils or mixed oils. This basic oil will be selected according to the use envisaged for the lubricating composition. It should be realised that the lubricating compositions according to the invention may likewise contain additives, such as colouring matter, anti-frothing and other agents, as is well known in the industry.

The products added according to the present invention can likewise be used in other mineral oils, such as engine fuels, hydraulic fluids, cutting oils, rinsing oils, oils for turbines, transformers etc. It is likewise possible to add them to oils for gears and greases containing mineral oils.

The following examples will better show the scope and importance of the invention.

For these examples two additives A and B were prepared according to the invention under the following conditions:

First of all, some fumaric acid was esterified with oleyl alcohol in the presence of acid catalyst, p-toluene sulphonic acid, and xylene. The oleyl fumarate thus obtained was then treated as follows:

| Treatment | Additives | |
|---|---|---|
| | A | B |
| Copolymerisation: The oleyl fumarate was copolymerised with vinyl acetate in the presence of 2 grammes benzoyl peroxide by heating for 2 hours at 80° C., then for 6 hours at 100° C. in the following proportions— | | |
| Oleyl fumarate (in grammes) | 84 | 86 |
| Vinyl acetate (in grammes) | 16 | 14 |
| A solution of 33% by weight of the copolymer so obtained and dissolved in an industrial white oil has a viscosity at 99° C. in centistokes | 137.6 | 45 |
| Treatment with $P_2S_5$: This copolymer was treated with 10% by weight $P_2S_5$ at 120° C. for 3 hours. The substances obtained have the following properties— | | |
| Viscosity in centistokes at 99° C. of a 33% solution in white oil | 182.9 | 60.1 |
| Acid number | 20 | 22 |
| Ethoxylation: The substances obtained as stated above were condensed at 120° C. with ethylene oxide in the presence of catalytic amounts of $BF_3$/phenol complex. After 2 hours' reaction, the percentage by weight of ethylene oxide fixed was | 6 | 7 |

Example I.—$H_2S$ stability

Tests conducted on a lubricating oil (of viscosity at 99° C. of 14.2 centistokes and viscosity index 100) containing 6% of products A and B made it possible to note that there was no liberation of $H_2S$.

Example II.—Improvement in viscosity index

By adding additives A and B to a paraffin oil having a viscosity index of 113 and a viscosity of 5.4 centistokes at 99° C., the following results were obtained:

| Additive Nature | Percent by weight | Characteristics of oil | |
|---|---|---|---|
| | | Viscosity index | Viscosity at 99° C. in cs. |
| Nil | | 113 | 5.4 |
| A | 1 | 120 | 5.8 |
| A | 2 | 125 | 6.3 |
| B | 2 | 120 | 6.0 |

Example III.—Detergence and anti-varnish properties

Engine tests were carried out using a mineral oil without additive and the same oil containing a certain percentage of additives A and B.

These tests were carried out according to standard CRC FL2 (Co-ordinating Research Council) adapted to a Peugeot 203 engine (4 cylinders, bore 75 mm., stroke 73 mm., total cylinder capacity 1290 cc.—volumetric compression 6.8—speed 2500 r.p.m.); time of test 50 hours, output 20 H.P.

Temperature of oil _____55° C.
Temperature of water:
  Inlet _____33° C.
  Outlet _____35° C.

This test is of the type known as the "cold test."

The oils tested had the following compositions and characteristics:

| | Without additive | According to the invention | |
|---|---|---|---|
| | Oil I | Oil II | Oil III |
| Composition: | | | |
| Paraffin oil, percent | 100 | 98 | 97 |
| Product A, percent | | 2 | |
| Product B, percent | | | 3 |
| Main characteristics: | | | |
| Viscosity index | 138 | 142 | 139 |
| Viscosity at 99° C. in centistokes | 11.6 | 13 | 12.2 |
| Acid number | 0.05 | 0.1 | 0.1 |
| Copper sheet corrosion: (ASTM D 130 55T) coloration | | 2a | 2b |

The results of these tests were as follows:

| Results | Oil | | |
|---|---|---|---|
| | I | II | III |
| Detergence: | | | |
| Cleanliness of combustion chamber, merit mark [1] | 6.8 | 10 | 10 |
| Sludge deposit on oil filter and crankshaft in grammes | 40 | 5.9 | 5.5 |
| Anti-varnish properties: | | | |
| Varnish on pistons and liners, merit mark [1] | 5.5 | 8.4 | 8.6 |
| Varnish on rocker arm tappets | very thick | nil | nil |

[1] Cleanliness is given marks from 10 to 0. Mark 10 is given when there is no deposit, mark 0 when the part of the engine in question is completely covered.

Example IV.—Extreme pressure properties

Tests of resistance to high pressures were carried out on a blend consisting of additive A and a paraffin oil (viscosity index 113 and viscosity at 99° C. 5.4 centistokes) in the 4-ball machine (see pages 446–448, volume III, 2nd World Petroleum Congress and S.A.E. Journal, volume 44, No. 5, page 196, May 1939).

These tests have yielded the following results:

| Additive | Percent in basic oil | Welding obtained in kg. | Load to obtain seizing in 2½ sec. (in kg.) |
|---|---|---|---|
| Nil | | 110 | 50 |
| A | 5 | 220 | 120 |

What we claim is:

1. A material obtained by phosphosulfurizing a copolymer of vinyl acetate and a $C_9$ to $C_{18}$ unsaturated aliphatic alcohol ester of a $C_4$ $\alpha,\beta$-unsaturated carboxylic acid, and then reacting the phosphosulfurized material with a $C_2$ to $C_6$ alkylene oxide.

2. A material according to claim 1, wherein said acid is fumaric acid and said alkylene oxide is ethylene oxide.

3. A material, useful as a lubricating oil additive, obtained by reacting a polymeric material prepared from an ester with phosphorus sulfide and then reacting the phosphosulfurized derivative so obtained with an alkylene oxide containing 2 to 6 carbon atoms, wherein said ester is the ester of an $\alpha,\beta$-unsaturated carboxylic acid having 1 to 2 carboxylic groups and containing a maximum of 4 carbon atoms and an unsaturated aliphatic alcohol containing 3 to 20 carbon atoms, and wherein the unsaturation of said acid and said alcohol is due to double bonds.

4. A material according to claim 3, wherein said $\alpha,\beta$-unsaturated carboxylic acid is a dicarboxylic acid having 4 carbon atoms.

5. A material according to claim 3, wherein said polymer is obtained by polymerizing said ester at 50 to 150° C. for 2 to 100 hours in the presence of benzyl peroxide.

6. A material according to claim 3, wherein said alkylene oxide is ethylene oxide.

7. A material according to claim 3, wherein the phosphorus sulfide is phosphorus pentasulfide.

References Cited in the file of this patent

UNITED STATES PATENTS

| 2,424,402 | Loane et al. | July 22, 1947 |
| 2,496,508 | Watson et al. | Feb. 7, 1950 |
| 2,653,161 | Ballard et al. | Sept. 22, 1953 |
| 2,656,313 | Bartlett | Oct. 20, 1953 |
| 2,689,258 | McDermott | Sept. 1, 1954 |
| 2,783,202 | McDermott | Feb. 26, 1957 |

FOREIGN PATENTS

| 1,131,205 | France | Feb. 19, 1957 |
| 1,137,043 | France | May 22, 1957 |